United States Patent
Zhou et al.

(10) Patent No.: US 12,396,040 B2
(45) Date of Patent: Aug. 19, 2025

(54) MOBILE PLATFORM COMMUNICATION METHOD, DEVICE, SYSTEM, AND STORAGE MEDIUM

(71) Applicant: SZ DJI TECHNOLOGY CO., LTD., Shenzhen (CN)

(72) Inventors: Xian Zhou, Shenzhen (CN); Deen Zheng, Shenzhen (CN); Chao Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 643 days.

(21) Appl. No.: 17/383,085

(22) Filed: Jul. 22, 2021

(65) Prior Publication Data
US 2021/0352746 A1 Nov. 11, 2021

Related U.S. Application Data

(63) Continuation of application No. PCT/CN2019/073237, filed on Jan. 25, 2019.

(51) Int. Cl.
*H04W 76/10* (2018.01)
*H04W 12/06* (2021.01)
*H04W 12/10* (2021.01)

(52) U.S. Cl.
CPC ........... *H04W 76/10* (2018.02); *H04W 12/06* (2013.01); *H04W 12/10* (2013.01)

(58) Field of Classification Search
CPC ..... H04W 76/10; H04W 12/10; H04W 12/04; H04L 2463/062
See application file for complete search history.

(56) References Cited

U.S. PATENT DOCUMENTS

| | | | |
|---|---|---|---|
| 2018/0096609 A1* | 4/2018 | de la Cruz | G08G 5/0069 |
| 2019/0087576 A1* | 3/2019 | Olson | G06F 21/44 |

(Continued)

FOREIGN PATENT DOCUMENTS

| | | |
|---|---|---|
| CN | 102478657 A | 5/2012 |
| CN | 204802093 U | 11/2015 |
| CN | 105761550 A | 7/2016 |

(Continued)

OTHER PUBLICATIONS

The World Intellectual Property Organization (WIPO) International Search Report for PCT/CN2019/073237 Oct. 15, 2019 5 pages (translation included).

*Primary Examiner* — Ellen Tran
(74) *Attorney, Agent, or Firm* — ANOVA LAW GROUP, PLLC

(57) ABSTRACT

A communication method includes generating a first connection request including verification information of a mobile platform, and sending the verification information of the mobile platform to a first control terminal communicatively connected to the mobile platform, so that a second control terminal receives the verification information of the mobile platform obtained by the first control terminal and generates a second connection request. The method further includes establishing a mobile network communication link with the second control terminal after verification of the verification information in the first connection request and verification information in the second connection request is passed.

17 Claims, 8 Drawing Sheets

(56) References Cited

U.S. PATENT DOCUMENTS

2020/0120563 A1* 4/2020 Takács ............ H04W 36/00835
2021/0352746 A1* 11/2021 Zhou ................... H04W 12/033

FOREIGN PATENT DOCUMENTS

| CN | 107113177 A | 8/2017 |
| CN | 107357314 A | 11/2017 |
| CN | 107409051 A | 11/2017 |
| CN | 107612954 A | 1/2018 |
| CN | 108206858 A | 6/2018 |
| CN | 108496379 A | 9/2018 |
| CN | 108702203 A | 10/2018 |

* cited by examiner

MOBILE PLATFORM COMMUNICATION METHOD, DEVICE, SYSTEM, AND STORAGE MEDIUM

CROSS-REFERENCE TO RELATED APPLICATION

This application is a continuation of International Application No. PCT/CN2019/073237, filed Jan. 25, 2019, the entire content of which is incorporated herein by reference.

TECHNICAL FIELD

The present disclosure relates to the technical field of unmanned aerial vehicle and, more particularly, to a communication method, device, system, and storage medium of a mobile platform.

BACKGROUND

With the development of wireless control technology, a mobile platform such as an unmanned aerial vehicle, a remote control vehicle, etc. has been widely used in production and daily life. Generally, the mobile platform communicates with a control terminal using a predetermined wireless frequency band, such as a transmission control instruction or image data collected by the mobile platform.

In existing technology, it is limited to frequency band resources in mobile platform applications such as civilian and industrial unmanned aerial vehicles. Control and image transmission links between the mobile platform and the control terminal are generally established on 2.4 GHz or 5.8 GHz open frequency band. In this frequency band, control distance is limited, and signal interference is relatively large. Even with use of a range extender and a signal power amplifier, current wireless frequency band control distance range of the mobile platform such as the unmanned aerial vehicle is also limited within a range of 10 km, which makes it impossible to achieve long-distance operation of the mobile platform.

SUMMARY

In accordance with the disclosure, there is provided a communication method including generating a first connection request including verification information of a mobile platform, and sending the verification information of the mobile platform to a first control terminal communicatively connected to the mobile platform, so that a second control terminal receives the verification information of the mobile platform obtained by the first control terminal and generates a second connection request. The method further includes establishing a mobile network communication link with the second control terminal after verification of the verification information in the first connection request and verification information in the second connection request is passed.

Also in accordance with the disclosure, there is provided a mobile platform including a communication interface, a memory storing program codes, and a processor configured to execute the program codes to generate a first connection request including verification information of the mobile platform, and send the verification information of the mobile platform to a first control terminal communicatively connected to the mobile platform, so that a second control terminal receives the verification information of the mobile platform obtained by the first control terminal and generates a second connection request. The processor is further configured to execute the program codes to establish a mobile network communication link with the second control terminal after verification of the verification information in the first connection request and verification information in the second connection request is passed.

BRIEF DESCRIPTION OF THE DRAWINGS

In order to explain the technical solutions in the embodiments of the present disclosure more clearly, reference is made to the accompanying drawings, which are used in the description of the embodiments. Obviously, the drawings in the following description are some embodiments of the present disclosure, and other drawings can be obtained from these drawings without any inventive effort for those of ordinary skill in the art.

DETAILED DESCRIPTION OF THE EMBODIMENTS

The technical solutions in the embodiments of the present disclosure will be clearly described with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

It should be noted that when a component is referred to as being "fixed to" another component, it can be directly attached to the other component or an intervening component may also exist. When a component is considered to be "connected" to another component, it can be directly connected to the other component or an intervening component may exist at the same time.

Unless otherwise defined, all technical and scientific terms used herein have the same meaning as commonly understood by those skilled in the technical field of the present disclosure. The terms used in the description of the present disclosure herein are for the purpose of describing specific embodiments only and are not intended to limit the present disclosure. The term "and/or" as used herein includes any and all combinations of one or more listed items associated.

Hereinafter, some embodiments of the present disclosure will be described in detail with reference to the accompanying drawings. In the case of no conflict, the following embodiments and features in the embodiments can be combined with each other.

Figure 1:
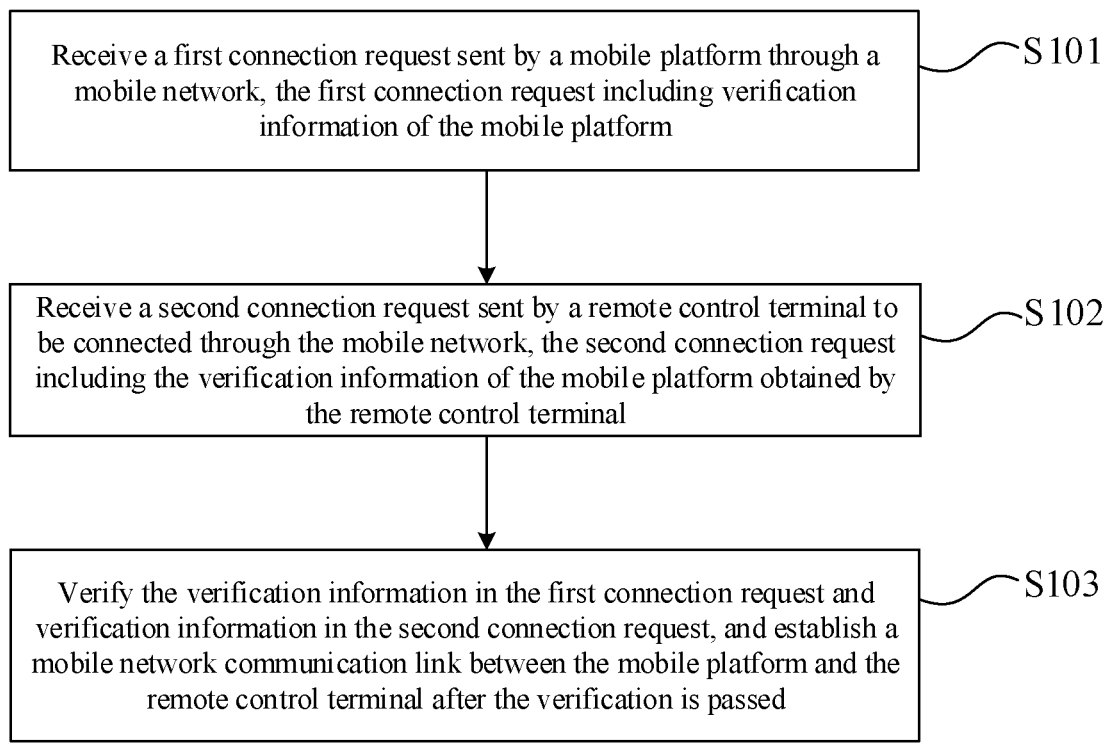
FIG. 1 is a flow chart of a communication method of a mobile platform according to an embodiment of the present disclosure.

The embodiments of the present disclosure provide a communication method of a mobile platform. FIG. 1 is a flow chart of the communication method of the mobile platform consistent with the present disclosure. As shown in FIG. 1, in some embodiments, an execution subject of the method is a server, and the method includes the following processes.

Process S101, receiving a first connection request sent by the mobile platform through a mobile network, the first connection request including verification information of the mobile platform.

In some embodiments, the execution subject of the method may be a server, which may be an HTTPS-WEB server. Correspondingly, the first connection request sent by the mobile platform through the mobile network may be a request of HTTPS protocol, where the mobile platform may include but is not limited to an unmanned aerial vehicle, a remote control vehicle, etc. The server in some other embodiments is not limited to the HTTPS-WEB server, and the protocol used in the connection request can be selected according to actual needs.

In some embodiments, the mobile platform may first obtain the verification information of the mobile platform, where the verification information may be one or more of a flight code of the mobile platform, a serial number of the mobile platform, another predetermined verification code, etc. In some other embodiments, it may also be a hash value generated based on the above verification code. The verification information can be obtained through negotiation with a short range control terminal that has communication connection with the mobile platform, or can be generated by the mobile platform (that is, obtained through a local processor or memory of the mobile platform), where the short range control terminal can be a remote control, a real-time kinematic (RTK) base station, etc. In some embodiments, the communication connection between the mobile platform and the short range control terminal can be realized through software defined radio (SDR) or another wireless communication method. After the mobile platform obtains the verification information of the mobile platform, when a mobile network communication link between the mobile platform and a remote control terminal needs to be established, a mobile terminal can generate the first connection request according to the verification information of the mobile platform. The first connection request can carry the verification information of the mobile platform, and the first connection request is sent to the server through the mobile network. The mobile network can include but is not limited to third-generation mobile communication network (3G network), fourth-generation mobile communication network (4G network), and fifth-generation mobile communication network (5G network).

Process S102, receiving a second connection request sent by the remote control terminal to be connected through the mobile network, the second connection request including verification information of the mobile platform obtained by the remote control terminal.

In some embodiments, the remote control terminal can also be a remote control, a RTK base station, etc. Since it is a remote control, the mobile network communication link can be established between the remote control terminal and the mobile platform, and an interaction between the remote control terminal and the mobile platform is realized through the mobile network communication link. The mobile network communication link can include but is not limited to the third-generation mobile communication network (3G network), the fourth-generation mobile communication network (4G network), and the fifth-generation mobile communication network (5G network).

In some embodiments, after generating or obtaining the verification information, the mobile platform sends the verification information of the mobile platform to the short range control terminal communicatively connected to the mobile platform, and the remote control terminal can obtain the verification information of the mobile platform from the short range control terminal. In some embodiments, a user of the short range control terminal can send the verification information of the mobile platform to a user of the remote control terminal through a remote information communication method, and then the user of the remote control terminal can enter the verification information of the mobile platform to the remote control terminal. In some other embodiments, the remote control terminal can automatically send the verification information of the mobile platform to the remote control terminal through the remote information communication method, or the remote control terminal can obtain the verification information of the mobile platform through other means. It should be understood that the remote information communication method may include but is not limited to short message service (SMS), multimedia message service (MMS), iMessage, and telephone. After obtaining the verification information of the mobile platform, the remote control terminal generates the second connection request according to the verification information of the mobile platform, and sends the second connection request to the server through the mobile network, where the second connection request can carry the verification information of the mobile platform.

It should be noted that the present disclosure does not limit the order of process S101 and process S102, and they can also be performed at the same time. In addition, in some embodiments, after receiving the first connection request sent by the mobile platform, the server obtains the second connection request from the remote control terminal; or after receiving the second connection request sent by the remote control terminal, the server obtains the first connection request from the mobile platform.

Process S103, verifying the verification information in the first connection request and the verification information in the second connection request, and establishing the mobile network communication link between the mobile platform and the remote control terminal after the verification is passed.

In some embodiments, after the server obtains the first connection request and the second connection request, the verification information in the first connection request and the verification information in the second connection request can be verified, so as to realize matching and authentication of the mobile platform and the remote control terminal. After the verification is passed, the mobile network communication link between the mobile platform and the remote control terminal can be established. In some embodiments, the server can exchange mobile network address information of the mobile platform and the remote control terminal, such as IP address, port, etc. In some other embodiments, the verification of the verification information in the first connection request and the verification information in the second connection request can also be performed by the mobile platform. The server forwards the second connection request sent by the remote control terminal to the mobile platform, and the mobile platform performs the verification of the verification information in the first connection request and the verification information in the second connection request according to the first connection request generated by the mobile platform and the received second connection request.

In some embodiments, verifying the verification information in the first connection request and the verification information in the second connection request may include: comparing whether the verification information in the first connection request is the same as the verification information in the second connection request.

In some embodiments, since the verification information in the first connection request comes from the mobile platform, while the verification information in the second connection request is sent to the server from the mobile platform via the short range control terminal and then to the remote control terminal, the verification information in the first connection request should be the same as the verification information in the second connection request in order to determine whether the remote control terminal has an authority to connect with the mobile terminal. Therefore, in some embodiments, the verification information in the first connection request can be compared with the verification information in the second connection request to determine whether they are the same. If they are the same, the mobile network communication link between the mobile platform and the remote control terminal can be established, so as to realize security of the communication link and reject access of disguise or attack.

In some embodiments, establishing the mobile network communication link between the mobile platform and the remote control terminal after the verification is passed in process S103 may include: sending the mobile network address information of the mobile platform to the remote control terminal, so that the remote control terminal can establish the mobile network communication link with the mobile platform according to the mobile network address information of the mobile platform; and/or sending the mobile network address information of the remote control terminal to the mobile platform, so that the mobile platform can establish the mobile network communication link with the remote control terminal according to the mobile network address information of the remote control terminal.

In some embodiments, when the server exchanges the mobile network address information, it can be that the server sends the mobile network address information of the mobile platform to the remote control terminal, and the remote control terminal initiates a connection request to the mobile platform according to the mobile network address information of the mobile platform; it can also be that the server sends the mobile network address information of the remote control terminal to the mobile platform, and the mobile platform initiates a connection request to the remote control terminal according to the mobile network address information of the remote control terminal; in addition, it can also be that the server sends the mobile network address information of the mobile platform to the remote control terminal and sends the mobile network address information of the remote control terminal to the mobile platform, and the mobile platform and the remote control terminal establish the mobile network communication link based on each other's mobile network address information. In an example of point-to-point (P2P) communication, after two ends are initially connected to the mobile network, they are both NAT local IP addresses and cannot communicate directly. As long as external IP/ports of the ends are exchanged through a public network IP and then attempt to connect, and then the two ends initiate an attempt to connect again, firewall and routing rules can be opened up, so that point-to-point communication can be established. On the basis of P2P, it is verified whether tokens of two parties are issued by the same organization. If they are the same, they are considered to be credible, and handshake data obtains a consistent data group from the two ends, thereby the communication link is established.

In the communication method of the mobile platform consistent with the present disclosure, the mobile platform sends the first connection request to the server through the mobile network, the first connection request including the verification information of the mobile platform; the remote control terminal to be connected sends the second connection request to the server through the mobile network, the second connection request including the verification information of the mobile platform obtained by the remote control terminal; the server verifies the verification information in the first connection request and the verification information in the second connection request, and establishes the mobile network communication link between the mobile platform and the remote control terminal after the verification is passed. In some embodiments, a reliable mobile network communication link between the mobile platform and the remote control terminal is established through the matching and authentication of the mobile platform and the remote control terminal, so as to realize the interaction between the mobile platform and the remote control terminal, which is not limited by communication distance and has high security.

On the basis of any of the foregoing embodiments, the verification information can include the hash value of the mobile platform. The hash value of the mobile platform can improve information security of the mobile platform and prevent theft and embezzlement.

In some embodiments, the hash value of the mobile platform is generated by the mobile platform according to a flight verification code generated by the mobile platform. The flight verification code can be obtained through negotiation between the mobile platform and the short range control terminal that has communication connection with the mobile platform, or can be generated by the mobile platform (that is, obtained by the local processor or memory of the mobile platform), and then the mobile platform or the short range control terminal obtains the hash value corresponding to the flight verification code through hash operation. It should be noted that the remote control terminal obtains the verification information of the mobile platform, and the specific process can be that: after obtaining the flight verification code of the mobile platform, the remote control terminal performs the hash operation on the obtained flight verification code of the mobile platform; or the remote control terminal directly obtains the hash value corresponding to the flight verification code of the mobile platform.

Further, after receiving the first connection request and the second connection request, the server compares the hash value of the mobile platform in the first connection request with the hash value of the mobile platform in the second connection request. If the comparison results are consistent, the mobile network communication link between the mobile platform and the remote control terminal is established.

On the basis of any of the foregoing embodiments, the first connection request can also include a first random code generated by the mobile platform, and the second connection request can also include a second random code generated by the remote control terminal.

In some embodiments, the first random code generated by the mobile platform is carried in the first connection request, and the second random code generated by the remote control terminal is carried in the second connection request, so as to generate a communication key between the mobile platform and the remote control terminal. The specific process is as follows. After establishing the mobile network communication link between the mobile platform and the remote control terminal after the verification is passed in process S103, the method can also include: sending the first random code to the remote control terminal, and sending the second random code to the mobile platform, so that the mobile platform and the remote control terminal can generate the communication key according to the first random code, the second random code, and the verification information of the mobile platform.

In some embodiments, after completing the matching and authentication of the mobile platform and the remote control terminal, the server only exchanges the random codes to send to the two ends, that is, the first random code is sent to the remote control terminal, and the second random code is sent to the mobile platform. After receiving the random code from the other end, the mobile platform and the remote control terminal generate the communication key according to the first random code, the second random code, and the verification information of the mobile platform. The specific communication key is a triplet including the first random code, the second random code, and the verification information of the mobile platform. When the server sends the random codes to the two ends, only the random code of the other end is sent, so even if the information is tapped, the complete triplet cannot be obtained, and only the mobile platform and the remote control terminal can obtain the complete triplet, thereby improving communication security.

On the basis of the foregoing embodiments, in some other embodiments, after obtaining the communication key, the mobile platform and the remote control terminal can further encrypt and decrypt interactive data according to the communication key. For better description, in some embodiments, a first key is used to represent the communication key on side of the mobile platform, and a second key is used to represent the communication key on side of the remote control terminal.

In some embodiments, the mobile platform can encrypt first information to be sent to the remote control terminal with the first key and send to the remote control terminal; and the remote control terminal can decrypt with the second key after receiving the encrypted first information.

Similarly, the remote control terminal can also encrypt second information to be sent to the mobile platform with the second key and send to the mobile platform; and the mobile platform can decrypt with the first key after receiving the encrypted second information.

In some embodiments, the mobile platform and the remote control terminal can also renegotiate a session key, such as an image transmission key, an instruction key, etc.

For example, the mobile platform generates an image transmission key, and sends to the remote control terminal after encrypting the image transmission key with the first key; and then the mobile platform sends to the remote control terminal after encrypting image data collected by a collection device with the image transmission key.

As another example, the remote control terminal generates an instruction key, and sends to the mobile platform after encrypting the instruction key with the second key; and then the remote control terminal sends to the mobile platform after encrypting a control instruction with the instruction key.

In some embodiments, the renegotiated session key is encrypted with the communication key and then sent to the two ends, so that security of session key transmission can be improved, and further security of image transmission and instruction transmission can be improved.

Figure 2:
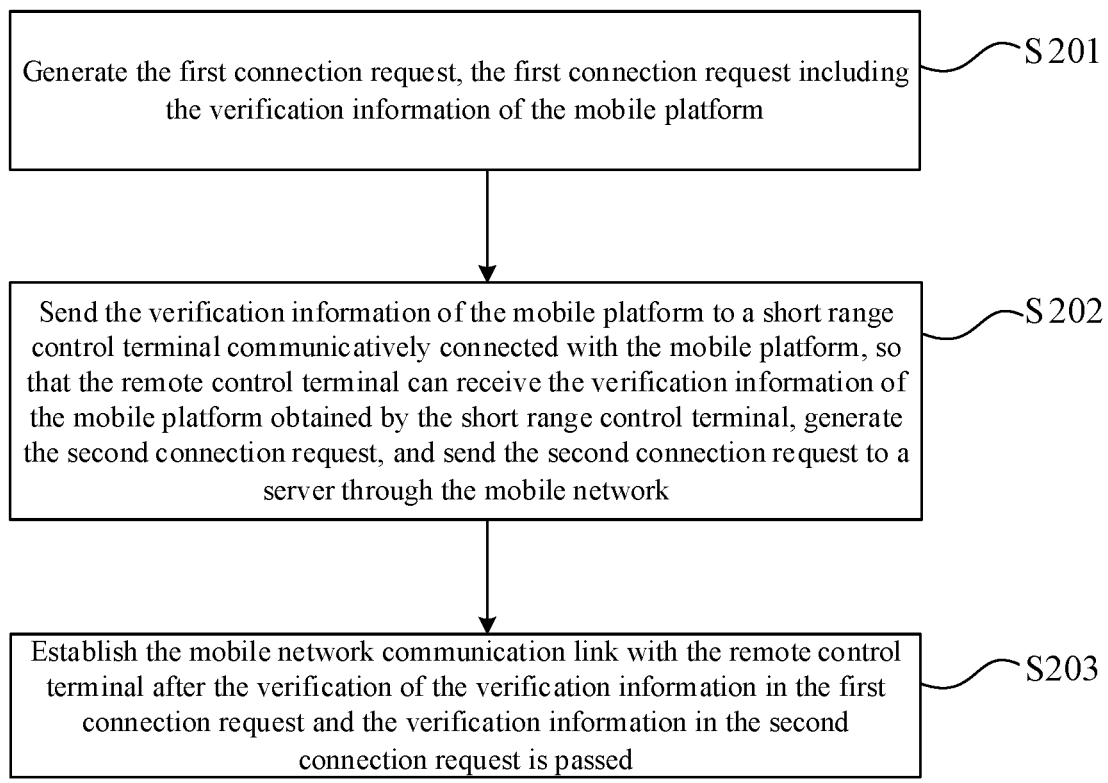
FIG. 2 is a flow chart of a communication method of a mobile platform according to another embodiment of the present disclosure.

The embodiments of the present disclosure provide a communication method of a mobile platform. FIG. 2 is a flow chart of the communication method of the mobile platform consistent with the present disclosure. As shown in FIG. 2, in some embodiments, the execution subject of the method is the mobile platform, which includes but is not limited to a remote control vehicle and an unmanned aerial vehicle. When the mobile platform is an unmanned aerial vehicle, it can be a multi-rotor unmanned aerial vehicle, including a vehicle body, multiple arms, and multiple rotors (such as 4 rotors, 6 rotors, 8 rotors, or another numbers of rotors) arranged at the multiple arms. The unmanned aerial vehicle can also carry loads such as a shooting device for photography or analysis, a spraying device for spraying medicine, etc. The method includes the following processes.

Process S201, generating the first connection request, the first connection request including the verification information of the mobile platform.

In some embodiments, the mobile platform may first obtain the verification information of the mobile platform, where the verification information may be one or more of the flight code of the mobile platform, the serial number of the mobile platform, another predetermined verification code, etc. In some other embodiments, it may also be the hash value of the above verification code. The verification information can be obtained through negotiation with the short range control terminal that has communication connection with the mobile platform, or can be generated by the mobile platform (that is, obtained through the local processor or memory of the mobile platform). After the mobile platform obtains the verification information of the mobile platform, when the mobile network communication link between the mobile platform and the remote control terminal needs to be established, the mobile terminal can generate the first connection request according to the verification information of the mobile platform, and the first connection request can carry the verification information of the mobile platform. In some embodiments, if a verification task of the verification information in the first connection request and the verification information in the second connection request is implemented by the server, the first connection request needs to be sent to the server through the mobile network. The mobile network can include but is not limited to the third-generation mobile communication network (3G network), the fourth-generation mobile communication network (4G network), and the fifth-generation mobile communication network (5G network). In some other embodiments, the verification task of the verification information in the first connection request and the verification information in the second connection request is performed by the mobile platform, then the first connection request does not need to be sent to the server, but the second connection request sent to the server by the remote control terminal forwarded by the server needs to be received.

Process S202, sending the verification information of the mobile platform to the short range control terminal communicatively connected to the mobile platform, so that the remote control terminal can receive the verification information of the mobile platform obtained by the short range control terminal, generate the second connection request, and send the second connection request to the server through the mobile network.

In some embodiments, after obtaining the verification information, the mobile platform sends the verification information of the mobile platform to the short range control terminal communicatively connected to the mobile platform, so that the remote control terminal can obtain the verification information of the mobile platform from the short range control terminal. In some embodiments, the user of the short range control terminal can send the verification information of the mobile platform to the user of the remote control terminal through the remote information communication method, and then the user of the remote control terminal can enter the verification information of the mobile platform to the remote control terminal. In some other embodiments, the remote control terminal can automatically send the verification information of the mobile platform to the remote control terminal through the remote information communication method, or the remote control terminal can obtain the verification information of the mobile platform through other means. It should be understood that the remote information communication method may include but is not limited to short message service (SMS), multimedia message service (MMS), iMessage, and telephone. After obtaining the verification information of the mobile platform, the remote control terminal generates the second connection request according to the verification information of the mobile platform, and sends the second connection request to the server through the mobile network, where the second connection request can carry the verification information of the mobile platform. It should be noted that the present disclosure does not limit the order of process S201 and process S202, and they can also be performed at the same time.

Process S203, establishing the mobile network communication link with the remote control terminal after the verification of the verification information in the first connection request and the verification information in the second connection request is passed.

In some embodiments, the verification information in the first connection request and the verification information in the second connection request are verified, so as to realize the matching and authentication of the mobile platform and the remote control terminal. After the verification is passed, the mobile network communication link between the mobile platform and the remote control terminal can be established. The mobile network communication link can include but is not limited to the third-generation mobile communication network (3G network), the fourth-generation mobile communication network (4G network), and the fifth-generation mobile communication network (5G network), through which the interaction between the remote control terminal and the mobile platform is realized.

In some embodiments, the verification information in the first connection request and the verification information in the second connection request are verified through the mobile platform.

In some embodiments, the method may also include: receiving the second connection request forwarded by the server sent by the remote control terminal to the server.

In some embodiments, the mobile platform receives the second connection request of the remote control terminal forwarded by the server, and then verifies the verification information in the first connection request and the verification information in the second connection request according to the first connection request generated by the mobile platform and the received second connection request. After the verification is passed, the mobile network communication link between the mobile platform and the remote control terminal can be established. The mobile platform can notify the server of the verification result, and the server can implement exchange of the mobile network address information of the two parties to be connected. The mobile platform can also directly obtain the mobile network address information of the remote control terminal from the server.

In some other embodiments, the verification task of the verification information in the first connection request and the verification information in the second connection request is performed by the server, that is, the method may also include: sending the first connection request to the server through the mobile network; verifying the verification information in the first connection request and the verification information in the second connection request through the server.

In some embodiments, the mobile platform can send the first connection request to the server through the mobile network. After the server obtains the first connection request and the second connection request, the verification information in the first connection request and the verification information in the second connection request can be verified, so as to realize the matching and authentication of the mobile platform and the remote control terminal. After the verification is passed, the mobile network communication link between the mobile platform and the remote control terminal can be established.

For the specific principles and implementation manners of the method consistent with the present disclosure, reference may be made to the embodiments described above, which will not be repeated herein.

In the communication method of the mobile platform consistent with the present disclosure, the mobile platform sends the first connection request to the server through the mobile network, the first connection request including the verification information of the mobile platform; the remote control terminal to be connected sends the second connection request to the server through the mobile network, the second connection request including the verification information of the mobile platform obtained by the remote control terminal; the mobile network communication link between the mobile platform and the remote control terminal is established after the verification of the verification information in the first connection request and the verification information in the second connection request is passed. In some embodiments, a reliable mobile network communication link between the mobile platform and the remote control terminal is established through the matching and authentication of the mobile platform and the remote control terminal, so as to realize the interaction between the mobile platform and the remote control terminal, which is not limited by communication distance and has high security.

On the basis of any of the foregoing embodiments, establishing the mobile network communication link with the remote control terminal after the verification of the verification information in the first connection request and the verification information in the second connection request is passed described in process S203 can include: receiving the mobile network address information of the remote control terminal sent by the server after the verification of the verification information in the first connection request and the verification information in the second connection request is passed; establishing the mobile network communication link with the remote control terminal according to the mobile network address information of the remote control terminal.

In some embodiments, the server can send the mobile network address information of the remote control terminal to the mobile platform, and the mobile platform initiates the connection request to the remote control terminal according to the mobile network address information of the remote control terminal, so that the mobile platform and the remote control terminal can establish the mobile network communication link.

On the basis of any of the foregoing embodiments, sending the verification information of the mobile platform to the short range control terminal communicatively connected to the mobile platform described in process S202 can include: sending the verification information of the mobile platform to the short range control terminal communicatively connected to the mobile platform through the communication connection, so that the user of the short range control terminal can send the verification information of the mobile platform to the user of the remote control terminal through the remote information communication method, and then the user of the remote control terminal can enter the verification information of the mobile platform to the remote control terminal, or the short range control terminal can send the verification information of the mobile platform to the remote control terminal through the communication connection.

In some embodiments, the mobile platform can send the verification information of the mobile platform to the short range control terminal through SDR or another wireless communication method, and then the remote control terminal can obtain the verification information of the mobile platform from the short range control terminal. The user of the short range control terminal can send the verification information of the mobile platform to the user of the remote control terminal through the remote information communication method, and then the user of the remote control terminal can enter the verification information of the mobile platform to the remote control terminal. In some other embodiments, the remote control terminal can automatically send the verification information of the mobile platform to the remote control terminal through the remote information communication method, or the remote control terminal can obtain the verification information of the mobile platform through other means. It should be understood that the remote information communication method may include but is not limited to short message service (SMS), multimedia message service (MMS), iMessage, and telephone.

On the basis of any of the foregoing embodiments, before sending the first connection request to the server through the mobile network described in process S201, the method can also include: obtaining the verification information of the mobile platform.

In some embodiments, the mobile platform can obtain the verification information of the mobile platform through negotiation with the short range control terminal that has communication connection with the mobile platform, or the verification information can be generated by the mobile platform.

In some embodiments, obtaining the verification information of the mobile platform includes: obtaining the flight verification code of the mobile platform, and obtaining hash value of the flight verification code according to the flight verification code.

In some embodiments, the verification information includes the hash value of the mobile platform, and the hash value of the mobile platform can improve information security of the mobile platform and prevent theft and embezzlement. The hash value of the mobile platform is generated by the mobile platform according to the flight verification code generated by the mobile platform. The flight verification code can be obtained through negotiation between the mobile platform and the short range control terminal that has communication connection with the mobile platform, or can be generated by the mobile platform, and then the mobile platform or the short range control terminal obtains the hash value corresponding to the flight verification code through the hash operation.

Figure 3:
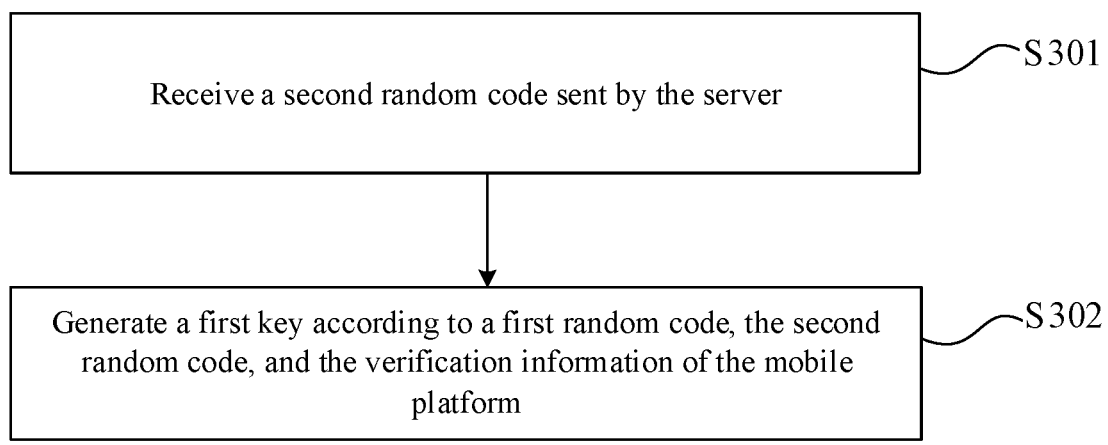
FIG. 3 is a flow chart of a communication method of a mobile platform according to another embodiment of the present disclosure.

On the basis of any of the foregoing embodiments, the first connection request can also include the first random code generated by the mobile platform; the second connection request can also include the second random code generated by the remote control terminal. Further, as shown in FIG. 3, after establishing the mobile network communication link with the remote control terminal described in process S203, the method can also include: receiving the second random code sent by the server (process S301); and generating the first key according to the first random code, the second random code, and the verification information of the mobile platform (process S302). The communication key is the same as the second key generated by the remote control terminal according to the second random code, the verification information of the mobile platform, and the first random code sent by the server.

In some embodiments, after completing the matching and authentication of the mobile platform and the remote control terminal, the server only exchanges the random codes to send to the two ends, that is, the first random code is sent to the remote control terminal, and the second random code is sent to the mobile platform. After receiving the random code from the other end, the mobile platform and the remote control terminal generate the communication key according to the first random code, the second random code, and the verification information of the mobile platform. The specific communication key is the triplet including the first random code, the second random code, and the verification information of the mobile platform. When the server sends the random codes to the two ends, only the random code of the other end is sent, so even if the information is tapped, the complete triplet cannot be obtained, and only the mobile platform and the remote control terminal can obtain the complete triplet, thereby improving communication security.

On the basis of any of the foregoing embodiments, after generating the first key described in process S302, the method can also include: encrypting the first information to be sent to the remote control terminal with the first key and sending to the remote control terminal; and/or receiving the second information encrypted with the second key sent by the remote control terminal, and decrypting with the first key.

For example, after generating the first key described in process S302, the method may also include: generating the image transmission key, and sending to the remote control terminal after encrypting the image transmission key with the first key; sending to the remote control terminal after encrypting the image data collected by the collection device with the image transmission key.

For example, after generating the first key described in process S302, the method can also include: receiving the instruction key encrypted with the second key sent by the remote control terminal, and decrypting with the first key; receiving the control instruction encrypted with the instruction key sent by the remote control terminal, and decrypting with the instruction key obtained by decryption.

In some embodiments described above, the mobile platform and the remote control terminal can also renegotiate the session key, such as the image transmission key, the instruction key, etc. The renegotiated session key is encrypted with the communication key and then sent to the two ends, so that the security of session key transmission can be improved, and further the security of image transmission and instruction transmission can be improved.

Figure 4:
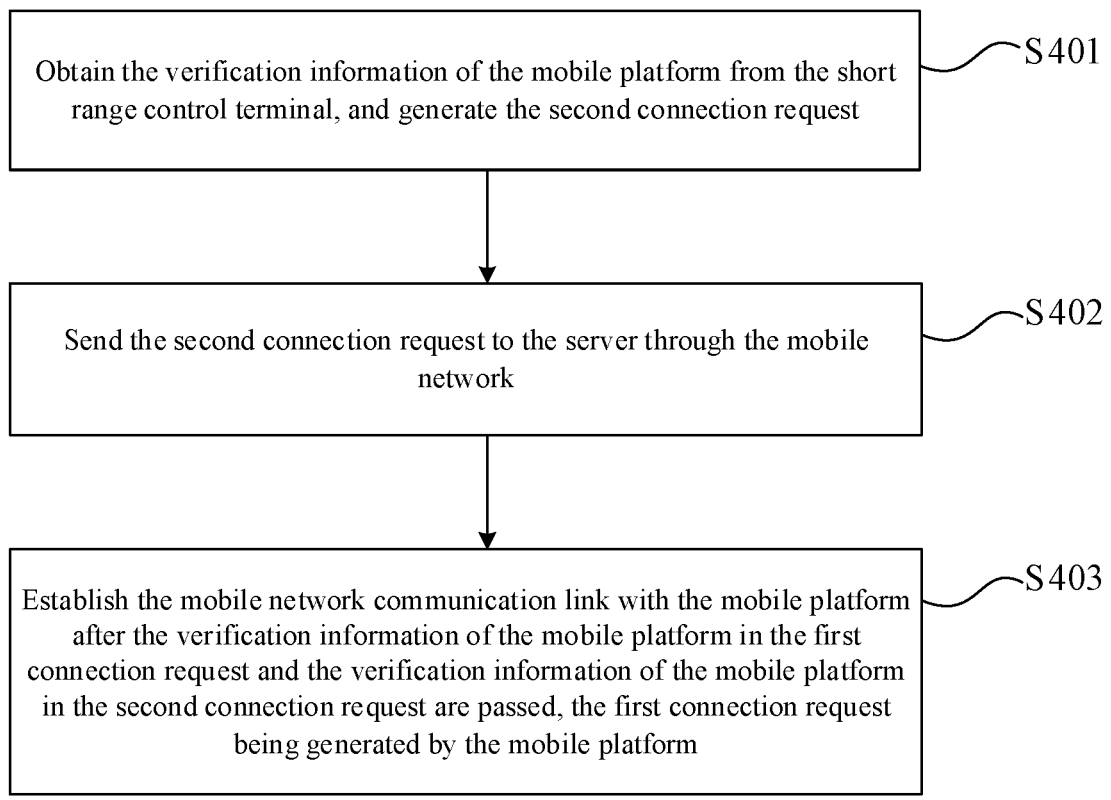
FIG. 4 is a flow chart of a communication method of a mobile platform according to another embodiment of the present disclosure.

The embodiments of the present disclosure provide a communication method of a mobile platform. FIG. 4 is a flow chart of the communication method of the mobile platform consistent with the present disclosure. As shown in FIG. 4, in some embodiments, the execution subject of the method is the remote control terminal, and the method includes the following processes.

Process S401, obtaining the verification information of the mobile platform from the short range control terminal, and generating the second connection request.

Process S402, sending the second connection request to the server through the mobile network.

In some embodiments, the remote control terminal can be a remote control, RTK base station, etc., and the remote control terminal can obtain the verification information of the mobile platform from the short range control terminal. For the verification information of the mobile platform and the process of obtaining the verification information of the mobile platform by the remote control terminal, reference can be made to the embodiments described above. After generating the second connection request, the remote control terminal sends the second connection request to the server through the mobile network. The mobile network can include but is not limited to the third-generation mobile communication network (3G network), the fourth-generation mobile communication network (4G Network), and the fifth-generation mobile communication network (5G network).

Process S403, establishing the mobile network communication link with the mobile platform after the verification information of the mobile platform in the first connection request and the verification information of the mobile platform in the second connection request are passed, the first connection request being generated by the mobile platform.

In some embodiments, the verification task of the verification information in the first connection request and the verification information in the second connection request can be performed by the server. After receiving the first connection request sent by the mobile platform to the server through the mobile network, and the second connection request sent by the remote control terminal to the server through the mobile network, the server can verify the verification information in the first connection request and the verification information in the second connection request, so as to realize the matching and authentication of the mobile platform and the remote control terminal. In some other embodiments, the verification task of the verification information in the first connection request and the verification information in the second connection request can also be performed by the mobile platform. The server forwards the second connection request sent by the remote control terminal to the server to the mobile platform, and the mobile platform verifies the verification information in the first connection request and the verification information in the second connection request according to the first connection request generated by the mobile platform and the received second connection request. After the verification is passed, the mobile network communication link between the mobile platform and the remote control terminal can be established. The mobile network communication link can include but is not limited to the third-generation mobile communication network (3G network), the fourth-generation mobile communication network (4G network), and the fifth-generation mobile communication network (5G network), through which the interaction between the remote control terminal and the mobile platform is realized.

In some embodiments, establishing the mobile network communication link with the mobile platform after the verification information of the mobile platform in the first connection request and the verification information of the mobile platform in the second connection request are passed described in process S403 includes: receiving the mobile network address information of the mobile platform sent by the server after the verification information of the mobile platform in the first connection request and the verification information of the mobile platform in the second connection request are passed; establishing the mobile network communication link with the mobile platform according to the mobile network address information of the mobile platform.

In some embodiments, the server can send the mobile network address information of the mobile platform to the remote control terminal, and the remote control terminal initiates the connection request to the mobile platform according to the mobile network address information of the mobile platform, so that the remote control terminal and the mobile platform can establish the mobile network communication link.

For the specific principles and implementation manners of the method consistent with the present disclosure, reference may be made to the embodiments described above, which will not be repeated herein.

In the communication method of the mobile platform consistent with the present disclosure, the mobile platform sends the first connection request to the server through the mobile network, the first connection request including the verification information of the mobile platform; the remote control terminal to be connected sends the second connection request to the server through the mobile network, the second connection request including the verification information of the mobile platform obtained by the remote control terminal; the server verifies the verification information in the first connection request and the verification information in the second connection request, and establishes the mobile network communication link between the mobile platform and the remote control terminal after the verification is passed. In some embodiments, a reliable mobile network communication link between the mobile platform and the remote control terminal is established through the matching and authentication of the mobile platform and the remote control terminal, so as to realize the interaction between the mobile platform and the remote control terminal, which is not limited by communication distance and has high security.

On the basis of any of the foregoing embodiments, obtaining the verification information of the mobile platform from the short range control terminal described in process S401 can include: receiving the verification information of the mobile platform entered by the user of the remote control terminal, the verification information of the mobile platform entered by the user of the remote control terminal being sent by the mobile platform to the short range control terminal communicatively connected to the mobile platform through the communication connection, and the verification information of the mobile platform being sent by the user of the short range control terminal to the user of the remote control terminal through the remote information communication method; or receiving the verification information of the mobile platform sent by the short range control terminal through the remote information communication method, the verification information of the mobile platform being sent by the mobile platform to the short range control terminal communicatively connected to the mobile platform through the communication connection.

In some embodiments, the mobile platform can send the verification information of the mobile platform to the short range control terminal through SDR or another wireless communication method, and then the remote control terminal can obtain the verification information of the mobile platform from the short range control terminal. The user of the short range control terminal can send the verification information of the mobile platform to the user of the remote control terminal through the remote information communication method, and then the user of the remote control terminal can enter the verification information of the mobile platform to the remote control terminal. In some other embodiments, the remote control terminal can automatically send the verification information of the mobile platform to the remote control terminal through the remote information communication method, or the remote control terminal can obtain the verification information of the mobile platform through other means. It should be understood that the remote information communication method may include but is not limited to short message service (SMS), multimedia message service (MMS), iMessage, and telephone.

On the basis of any of the foregoing embodiments, the verification information can include the hash value of the mobile platform. The hash value of the mobile platform can improve information security of the mobile platform and prevent theft and embezzlement.

Further, the hash value of the mobile platform is generated by the mobile platform according to the flight verification code generated by the mobile platform.

In some embodiments, the flight verification code can be obtained through negotiation between the mobile platform and the short range control terminal that has communication connection with the mobile platform, or can be generated by the mobile platform, and then the mobile platform or the short range control terminal obtains the hash value corresponding to the flight verification code through the hash operation. It should be noted that the remote control terminal obtains the verification information of the mobile platform, and the specific process can be that: after obtaining the flight verification code of the mobile platform, the remote control terminal performs the hash operation on the obtained flight verification code of the mobile platform; or the remote control terminal directly obtains the hash value corresponding to the flight verification code of the mobile platform.

On the basis of any of the foregoing embodiments, the first connection request can also include the first random code generated by the mobile platform; the second connection request can also include the second random code generated by the remote control terminal.

Figure 5:
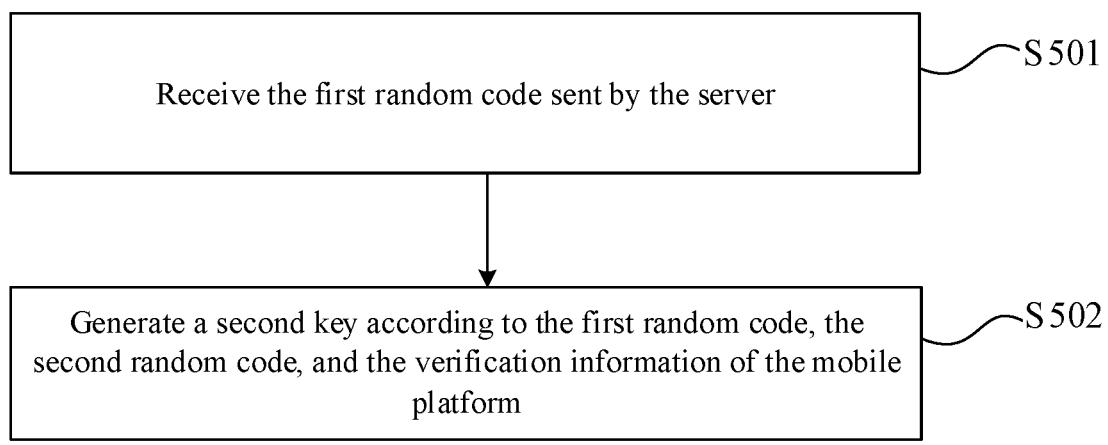
FIG. 5 is a flow chart of a communication method of a mobile platform according to another embodiment of the present disclosure.

Further, as shown in FIG. 5, after establishing the mobile network communication link with the mobile platform described in process S403, the method also includes: receiving the first random code sent by the server (process S501); generating the second key according to the first random code, the second random code, and the verification information of the mobile platform (process S502). The communication key is the same as the first key generated by the mobile platform according to the first random code, the verification information of the mobile platform, and the second random code sent by the server.

In some embodiments, after completing the matching and authentication of the mobile platform and the remote control terminal, the server only exchanges the random codes to send to the two ends, that is, the first random code is sent to the remote control terminal, and the second random code is sent to the mobile platform. After receiving the random code from the other end, the mobile platform and the remote control terminal generate the communication key according to the first random code, the second random code, and the verification information of the mobile platform. The specific communication key is the triplet including the first random code, the second random code, and the verification information of the mobile platform. When the server sends the random codes to the two ends, only the random code of the other end is sent, so even if the information is tapped, the complete triplet cannot be obtained, and only the mobile platform and the remote control terminal can obtain the complete triplet, thereby improving communication security.

On the basis of any of the foregoing embodiments, after generating the second key described in process S502, the method can also include: encrypting the second information to be sent to the mobile platform with the second key and sending to the mobile platform; and/or receiving the first information encrypted with the first key sent by the mobile platform, and decrypting with the second key.

For example, after generating the second key described in process S502, the method can also include: generating the instruction key, and sending to the mobile platform after encrypting the instruction key with the second key; sending to the mobile platform after encrypting the control instruction with the instruction key.

For example, after generating the second key described in process S502, the method can also include: receiving the image transmission key encrypted with the first key sent by the mobile platform, and decrypting with the second key; receiving the image data encrypted with the image transmission key sent by the mobile platform, and decrypting with the image transmission key obtained by decryption.

In some embodiments described above, the mobile platform and the remote control terminal can also renegotiate the session key, such as the image transmission key, the instruction key, etc. The renegotiated session key is encrypted with the communication key and then sent to the two ends, so that the security of session key transmission can be improved, and further the security of image transmission and instruction transmission can be improved.

Figure 6:
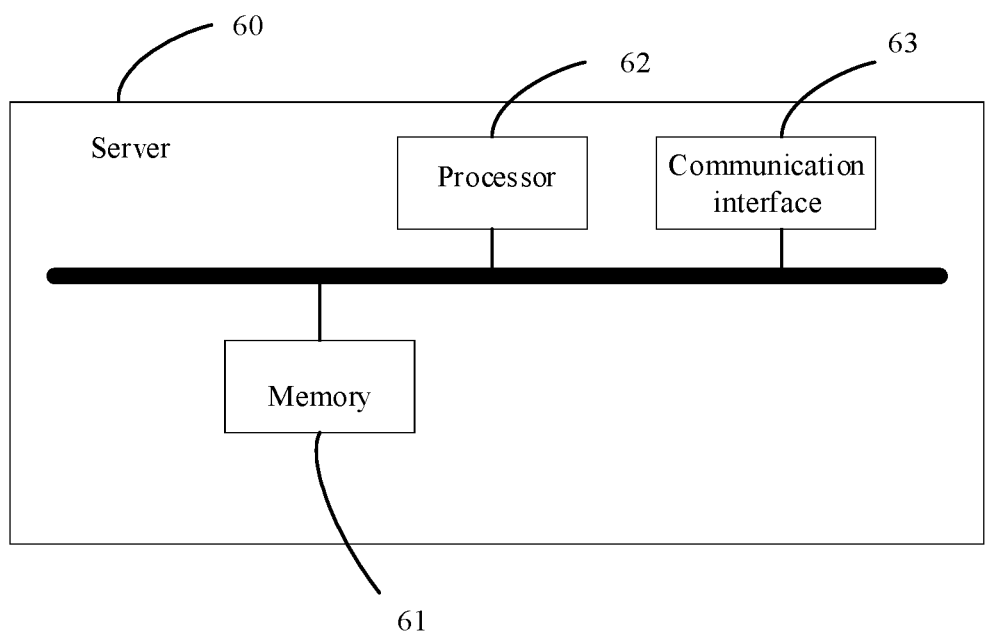
FIG. 6 is a structural diagram of a server according to an embodiment of the present disclosure.

The embodiments of the present disclosure provide a server. FIG. 6 is a structural diagram of the server according to an embodiment of the present disclosure. As shown in FIG. 6, a server 60 includes: a memory 61, a processor 62, and a communication interface 63. The memory 61 is configured to store program codes, and the processor 62 calls the program codes. When the program codes are executed, the processor 62 is configured to implement: receiving the first connection request sent by the mobile platform through the mobile network via the communication interface 63, the first connection request including verification information of the mobile platform; receiving the second connection request sent by the remote control terminal to be connected through the mobile network via the communication interface 63, the second connection request including the verification information of the mobile platform obtained by the remote control terminal; verifying the verification information in the first connection request and the verification information in the second connection request, and establishing the mobile network communication link between the mobile platform and the remote control terminal after the verification is passed.

On the basis of any of the foregoing embodiments, the verification information of the mobile platform obtained by the remote control terminal can include the verification information of the mobile platform obtained by the short range control terminal communicatively connected to the mobile platform received by the remote control terminal.

On the basis of any of the foregoing embodiments, when establishing the mobile network communication link between the mobile platform and the remote control terminal after the verification is passed, the processor 62 is configured to: send the mobile network address information of the mobile platform to the remote control terminal via the communication interface 63, so that the remote control terminal can establish the mobile network communication link with the mobile platform according to the mobile network address information of the mobile platform; and/or send the mobile network address information of the remote control terminal to the mobile platform via the communication interface 63, so that the mobile platform can establish the mobile network communication link with the remote control terminal according to the mobile network address information of the remote control terminal.

On the basis of any of the foregoing embodiments, when verifying the verification information in the first connection request and the verification information in the second connection request, the processor 62 is configured to: compare whether the verification information in the first connection request is the same as the verification information in the second connection request.

On the basis of any of the foregoing embodiments, the verification information can include the hash value of the mobile platform.

On the basis of any of the foregoing embodiments, the hash value of the mobile platform is generated by the mobile platform according to the flight verification code generated by the mobile platform.

On the basis of any of the foregoing embodiments, the first connection request can also include the first random code generated by the mobile platform, and the second connection request can also include the second random code generated by the remote control terminal. After establishing the mobile network communication link between the mobile platform and the remote control terminal after the verification is passed, the processor 62 is configured to: send the first random code to the remote control terminal, and send the second random code to the mobile platform, so that the mobile platform and the remote control terminal can generate the communication key according to the first random code, the second random code, and the verification information of the mobile platform.

On the basis of any of the foregoing embodiments, the mobile network can include at least one of the following: third-generation mobile communication network (3G network), fourth-generation mobile communication network (4G network), and fifth-generation mobile communication network (5G network).

For the specific principles and implementation manners of the server provided by the present disclosure, reference may be made to the embodiments shown in FIG. 1, which will not be repeated herein.

According to the server provided by the present disclosure, the mobile platform sends the first connection request to the server through the mobile network, the first connection request including the verification information of the mobile platform; the remote control terminal to be connected sends the second connection request to the server through the mobile network, the second connection request including the verification information of the mobile platform obtained by the remote control terminal; the server verifies the verification information in the first connection request and the verification information in the second connection request, and establishes the mobile network communication link between the mobile platform and the remote control terminal after the verification is passed. In some embodiments, a reliable mobile network communication link between the mobile platform and the remote control terminal is established through the matching and authentication of the mobile platform and the remote control terminal, so as to realize the interaction between the mobile platform and the remote control terminal, which is not limited by communication distance and has high security.

Figure 7:
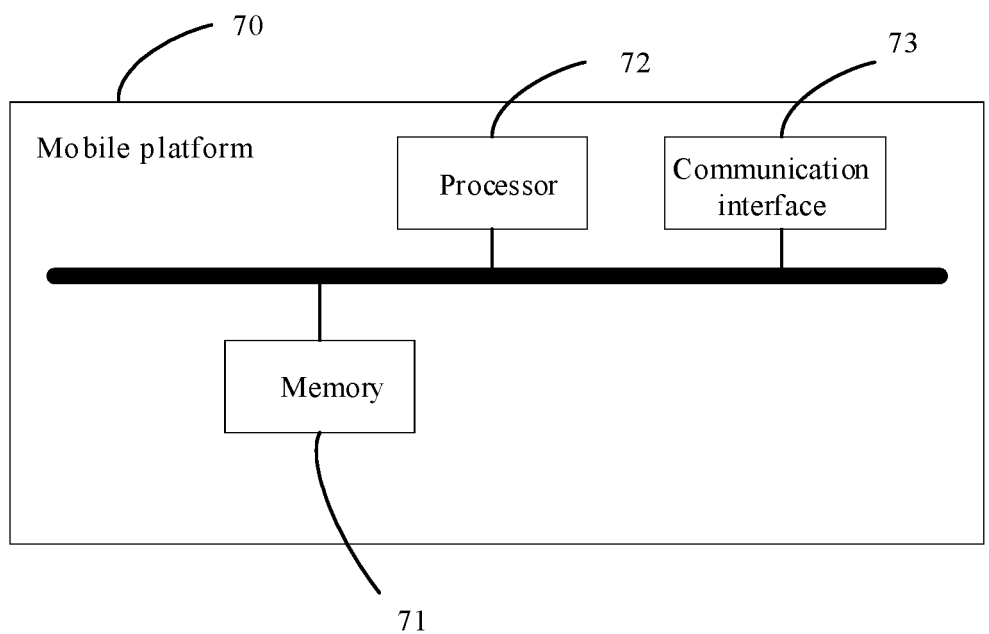
FIG. 7 is a structural diagram of a mobile platform according to an embodiment of the present disclosure.

The embodiments of the present disclosure provide a mobile platform. FIG. 7 is a structural diagram of the mobile platform according to an embodiment of the present disclosure. As shown in FIG. 7, a mobile platform 70 includes: a memory 71, a processor 72, and a communication interface 73. The memory 71 is configured to store program codes, and the processor 72 calls the program codes. When the program codes are executed, the processor 72 is configured to implement: sending the first connection request to the server through the mobile network via the communication interface 73, the first connection request including the verification information of the mobile platform; sending the verification information of the mobile platform to the short range control terminal communicatively connected to the mobile platform via the communication interface 73, so that the remote control terminal can receive the verification information of the mobile platform obtained by the short range control terminal, generate the second connection request, and send the second connection request to the server through the mobile network; establishing the mobile network communication link with the remote control terminal after the verification of the verification information in the first connection request and the verification information in the second connection request is passed.

On the basis of any of the foregoing embodiments, when establishing the mobile network communication link with the remote control terminal after the verification of the verification information in the first connection request and the verification information in the second connection request is passed, the processor 72 is configured to: receive the mobile network address information of the remote control terminal sent by the server via the communication interface 73 after the verification of the verification information in the first connection request and the verification information in the second connection request is passed; establish the mobile network communication link with the remote control terminal according to the mobile network address information of the remote control terminal.

On the basis of any of the foregoing embodiments, when sending the verification information of the mobile platform to the short range control terminal communicatively connected to the mobile platform via the communication interface 73, the processor 72 is configured to: send the verification information of the mobile platform to the short range control terminal communicatively connected to the mobile platform through the communication connection via the communication interface 73, so that the user of the short range control terminal can send the verification information of the mobile platform to the user of the remote control terminal through the remote information communication method, and then the user of the remote control terminal can enter the verification information of the mobile platform to the remote control terminal, or the short range control terminal can send the verification information of the mobile platform to the remote control terminal through the communication connection.

On the basis of any of the foregoing embodiments, before sending the first connection request to the server through the mobile network via the communication interface 73, the processor 72 is configured to: obtain the verification information of the mobile platform.

On the basis of any of the foregoing embodiments, when obtaining the verification information of the mobile platform, the processor 72 is configured to: obtain the flight verification code of the mobile platform via the communication interface 73, and obtain the hash value of the flight verification code according to the flight verification code.

On the basis of any of the foregoing embodiments, the first connection request can also include the first random code generated by the mobile platform; the second connection request can also include the second random code generated by the remote control terminal. After establishing the mobile network communication link with the remote control terminal, the processor 72 is configured to: receive the second random code sent by the server via the communication interface 73; generate the first key according to the first random code, the second random code, and the verification information of the mobile platform. The communication key is the same as the second key generated by the remote control terminal according to the second random code, the verification information of the mobile platform, and the first random code sent by the server.

On the basis of any of the foregoing embodiments, after generating the first key, the processor 72 is configured to: encrypt the first information to be sent to the remote control terminal with the first key, and send to the remote control terminal via the communication interface 73; and/or receive the second information encrypted with the second key sent by the remote control terminal via the communication interface 73, and decrypt with the first key.

On the basis of any of the foregoing embodiments, after generating the first key, the processor 72 is configured to: generate the image transmission key, and send to the remote control terminal via the communication interface 73 after encrypting the image transmission key with the first key; send to the remote control terminal via the communication interface 73 after encrypting the image data collected by the collection device with the image transmission key.

On the basis of any of the foregoing embodiments, after generating the first key, the processor 72 is configured to: receive the instruction key encrypted with the second key sent by the remote control terminal via the communication interface 73, and decrypt with the first key; receive the control instruction encrypted with the instruction key sent by the remote control terminal via the communication interface 73, and decrypt with the instruction key obtained by decryption.

On the basis of any of the foregoing embodiments, the mobile network can include at least one of the following: third-generation mobile communication network (3G network), fourth-generation mobile communication network (4G network), and fifth-generation mobile communication network (5G network).

On the basis of any of the foregoing embodiments, the mobile platform can include at least one of the following: a remote control vehicle and an unmanned aerial vehicle.

For the specific principles and implementation manners of the mobile platform provided by the present disclosure, reference may be made to the embodiments shown in FIGS. 2 and 3, which will not be repeated herein.

According to the mobile platform provided by the present disclosure, the mobile platform sends the first connection request to the server through the mobile network, the first connection request including the verification information of the mobile platform; the remote control terminal to be connected sends the second connection request to the server through the mobile network, the second connection request including the verification information of the mobile platform obtained by the remote control terminal; the server verifies the verification information in the first connection request and the verification information in the second connection request, and establishes the mobile network communication link between the mobile platform and the remote control terminal after the verification is passed. In some embodiments, a reliable mobile network communication link between the mobile platform and the remote control terminal is established through the matching and authentication of the mobile platform and the remote control terminal, so as to realize the interaction between the mobile platform and the remote control terminal, which is not limited by communication distance and has high security.

Figure 8:
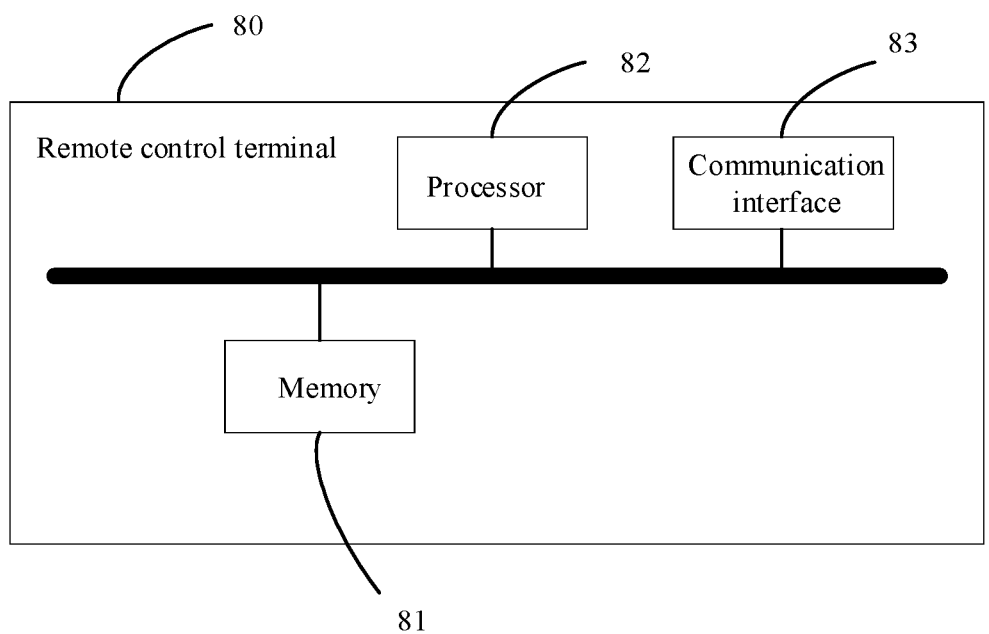
FIG. 8 is a structural diagram of a remote control terminal according to an embodiment of the present disclosure.

The embodiments of the present disclosure provide a remote control terminal. FIG. 8 is a structural diagram of the remote control terminal according to an embodiment of the present disclosure. As shown in FIG. 8, a remote control terminal 80 includes: a memory 81, a processor 82, and a communication interface 83. The memory 81 is configured to store program codes, and the processor 82 calls the program codes. When the program codes are executed, the processor 82 is configured to implement: obtaining the verification information of the mobile platform from the short range control terminal via the communication interface 83, and generating the second connection request; sending the second connection request to the server through the mobile network via the communication interface 83; establishing the mobile network communication link with the mobile platform after the verification information of the mobile platform in the first connection request and the verification information of the mobile platform in the second connection request are passed, the first connection request being generated by the mobile platform.

On the basis of any of the foregoing embodiments, when establishing the mobile network communication link with the mobile platform after the verification information of the mobile platform in the first connection request and the verification information of the mobile platform in the second connection request are passed, the processor 82 is configured to: receive the mobile network address information of the mobile platform sent by the server via the communication interface 83 after the verification information of the mobile platform in the first connection request and the verification information of the mobile platform in the second connection request are passed; establish the mobile network communication link with the mobile platform according to the mobile network address information of the mobile platform.

On the basis of any of the foregoing embodiments, when obtaining the verification information of the mobile platform from the short range control terminal via the communication interface 83, the processor 82 is configured to: receive the verification information of the mobile platform entered by the user of the remote control terminal via the communication interface 83, the verification information of the mobile platform entered by the user of the remote control terminal being sent by the mobile platform to the short range control terminal communicatively connected to the mobile platform through the communication connection, and the verification information of the mobile platform being sent by the user of the short range control terminal to the user of the remote control terminal through the remote information communication method; or receive the verification information of the mobile platform sent by the short range control terminal through the remote information communication method via the communication interface 83, the verification information of the mobile platform being sent by the mobile platform to the short range control terminal communicatively connected to the mobile platform through the communication connection.

On the basis of any of the foregoing embodiments, the verification information can include the hash value of the mobile platform.

On the basis of any of the foregoing embodiments, the hash value of the mobile platform is generated by the mobile platform according to the flight verification code generated by the mobile platform.

On the basis of any of the foregoing embodiments, the first connection request can also include the first random code generated by the mobile platform; the second connection request can also include the second random code generated by the remote control terminal. After establishing the mobile network communication link with the mobile platform, the processor 82 is configured to: receive the first random code sent by the server via the communication interface 83; generate the second key according to the first random code, the second random code, and the verification information of the mobile platform. The communication key is the same as the first key generated by the mobile platform according to the first random code, the verification information of the mobile platform, and the second random code sent by the server.

On the basis of any of the foregoing embodiments, after generating the second key, the processor 82 is configured to: encrypt the second information to be sent to the mobile platform with the second key, and send to the mobile platform via the communication interface 83; and/or receive the first information encrypted with the first key sent by the mobile platform via the communication interface 83, and decrypt with the second key.

On the basis of any of the foregoing embodiments, after generating the second key, the processor 82 is configured to: generate the instruction key, and send to the mobile platform via the communication interface 83 after encrypting the instruction key with the second key; send to the mobile platform via the communication interface 83 after encrypting the control instruction with the instruction key.

On the basis of any of the foregoing embodiments, after generating the second key, the processor 82 is configured to: receive the image transmission key encrypted with the first key sent by the mobile platform via the communication interface 83, and decrypt with the second key; receive the image data encrypted with the image transmission key sent by the mobile platform via the communication interface 83, and decrypt with the image transmission key obtained by decryption.

On the basis of any of the foregoing embodiments, the mobile network can include at least one of the following: third-generation mobile communication network (3G network), fourth-generation mobile communication network (4G network), and fifth-generation mobile communication network (5G network).

On the basis of any of the foregoing embodiments, the mobile platform can include at least one of the following: a remote control vehicle and an unmanned aerial vehicle.

For the specific principles and implementation manners of the remote control terminal provided by the present disclosure, reference may be made to the embodiments shown in FIGS. 4 and 5, which will not be repeated herein.

According to the remote control terminal provided by the present disclosure, the mobile platform sends the first connection request to the server through the mobile network, the first connection request including the verification information of the mobile platform; the remote control terminal to be connected sends the second connection request to the server through the mobile network, the second connection request including the verification information of the mobile platform obtained by the remote control terminal; the server verifies the verification information in the first connection request and the verification information in the second connection request, and establishes the mobile network communication link between the mobile platform and the remote control terminal after the verification is passed. In some embodiments, a reliable mobile network communication link between the mobile platform and the remote control terminal is established through the matching and authentication of the mobile platform and the remote control terminal, so as to realize the interaction between the mobile platform and the remote control terminal, which is not limited by communication distance and has high security.

In addition, the present disclosure also provides a computer readable storage medium in which a computer program is stored, and the computer program is executed by a processor to implement the communication method of the mobile platform on side of the server described in the foregoing embodiments.

In addition, the present disclosure also provides a computer readable storage medium in which a computer program is stored, and the computer program is executed by a processor to implement the communication method of the mobile platform on side of the mobile platform described in the foregoing embodiments.

In addition, the present disclosure also provides a computer readable storage medium in which a computer program is stored, and the computer program is executed by a processor to implement the communication method of the mobile platform on side of the remote control terminal described in the foregoing embodiments.

The disclosed apparatus and method can be implemented in other manners. For example, the example apparatus described above is only illustrative. For example, the division of the units is only a logical function division, and there may be other divisions in actual implementation, e.g., multiple units or components may be combined or integrated into another system, or some features may be omitted or not performed. In addition, the displayed or discussed mutual coupling or direct coupling or communication connection may be through some interfaces, and indirect coupling or communication connection of the apparatus or unit may be in electrical, mechanical, or another form.

The units described as separate components may or may not be physically separated, and the components displayed as units may or may not be physical units, i.e., they may be located in one place, or distributed on multiple network units. Some or all of the units may be selected according to actual needs to achieve the objectives of the present disclosure.

In addition, the functional units in each embodiment of the present disclosure may be integrated into one processing unit, or each unit may exist alone physically, or two or more units may be integrated into one unit. The integrated unit herein can be implemented in the form of hardware or hardware plus software functional unit.

The integrated unit implemented in the form of a software functional unit described above can be stored in a computer readable storage medium. The software functional unit described above is stored in a storage medium, including several instructions to cause a computer device (which may be a personal computer, a server, or a network device, etc.) or a processor to execute part processes of a method consistent with the present disclosure, such as one of the above-described example methods. The storage medium described above can include a USB disk, a mobile hard disk, a read-only memory (ROM), a random access memory (RAM), a magnetic disk, an optical disks, or another medium that can store program codes.

Those skilled in the art can clearly understand that for the convenience and conciseness of the description, only the division of the functional modules described above is used as an example for illustration. In practical applications, the functions described above can be allocated by different functional modules as required, i.e., the internal structure of the device is divided into different functional modules to complete all or some of the functions described above. For specific working process of the device described above, reference may be made to the corresponding process in the embodiments described above, which will not be repeated herein. Finally, it should be noted that the embodiments described above are only used to illustrate the technical solutions of the present disclosure rather than limiting them. Although the present disclosure has been described in detail with reference to all the described embodiments, those of ordinary skill in the art should understand that the technical solutions in all the described embodiments can still be modified, or some or all of the technical features can be equivalently replaced. The modifications or replacements do not cause the essence of the corresponding technical solutions to depart from the scope of the technical solutions in the embodiments of the present disclosure.

What is claimed is:

1. A communication method comprising:
  generating, by a mobile platform, a first connection request, the first connection request including first verification information of the mobile platform;
  sending, by the mobile platform via a software defined radio (SDR), the first verification information of the mobile platform to a control terminal;
  sending, by the mobile platform, the first connection request to a server; and
  establishing, by the mobile platform, a communication link between the control terminal and the mobile platform via a mobile network in response to the first verification information in the first connection request being same as second verification information of the mobile platform in a second connection request, the second connection request being generated by the control terminal based on the first verification information of the mobile platform and sent to the server by the control terminal, each of the first verification information and the second verification information of the mobile platform including identification information of the mobile platform, and the mobile network including at least one of a third-generation mobile communication network, a fourth-generation mobile communication network, or a fifth-generation mobile communication network.

2. The method of claim 1, further comprising:
  comparing the first verification information in the first connection request with the second verification information in the second connection request through the server.

3. The method of claim 1, wherein establishing the communication link between the control terminal and the mobile platform via the mobile network includes:
  receiving mobile network address information of the control terminal sent in response to the first verification information in the first connection request being same as the second verification information in the second connection request; and
  establishing the communication link between the control terminal and the mobile platform via the mobile network according to the mobile network address information of the control terminal.

4. The method of claim 1, further comprising, before generating the first connection request:
  obtaining the first verification information of the mobile platform.

5. The method of claim 1, wherein the identification information of the mobile platform includes at least one of a flight code of the mobile platform, a serial number of the mobile platform, a predetermined verification code, or a hash value of the mobile platform.

6. The method of claim 1, wherein a communication range of the SDR is different from a communication range of the mobile network.

7. The method of claim 1, wherein a communication range of the SDR is shorter than a communication range of the mobile network.

8. The method of claim 1, wherein:
  the identification information of the mobile platform includes at least one of information associated with a serial number of the mobile platform, or information associated with a predetermined verification code.

9. The method of claim 1, wherein:
  the identification information of the mobile platform includes a flight code of the mobile platform or a predetermined verification code.

10. A mobile platform comprising:
  a memory storing program codes; and
  a processor configured to execute the program codes to:
    generate a first connection request, the first connection request including first verification information of the mobile platform;
    send the first verification information of the mobile platform to a control terminal via a software defined radio (SDR);
    send the first connection request to a server; and
    establish a communication link with the control terminal via a mobile network in response to the first verification information in the first connection request being same as second verification information of the mobile platform in a second connection request, the second connection request being generated by the control terminal based on the first verification information of the mobile platform and sent to the server by the control terminal, each of the first verification information and the second verification information of the mobile platform including a flight code of the mobile platform or a predetermined verification code, and the mobile network including at least one of a third-generation mobile communication network, a fourth-generation mobile communication network, or a fifth-generation mobile communication network.

11. The mobile platform of claim 10, wherein
the server is configured to compare the first verification information in the first connection request with the second verification information in the second connection request.

12. The mobile platform of claim 10, wherein the processor is further configured to execute the program codes to:
receive mobile network address information of the control terminal in response to the first verification information in the first connection request being same as the second verification information in the second connection request; and
establish the communication link with the control terminal via the mobile network according to the mobile network address information of the control terminal.

13. The mobile platform of claim 10, wherein the processor is further configured to execute the program codes to, before generating the first connection request:
obtain the first verification information of the mobile platform.

14. The mobile platform of claim 10, wherein:
the first connection request further includes a first random code generated by the mobile platform and sent to the server, and the second connection request further includes a second random code generated by the control terminal and sent to the server;
the processor is further configured to execute the program codes to, after the communication link with the control terminal via the mobile network is established:
receive the second random code sent by the server; and
generate a first key according to the first random code, the second random code,
and the first verification information of the mobile platform; and
the first key is same as a second key, the second key being generated by the control terminal according to the second random code, the second verification information of the mobile platform, and the first random code sent by the server.

15. The mobile platform of claim 14, wherein the processor is further configured to execute the program codes to perform at least one of, after the first key is generated:
encrypting first information with the first key, and sending the first information to the control terminal; or
receiving second information encrypted with the second key and sent by the control terminal, and decrypting the second information using the first key.

16. A communication method comprising:
generating, by a mobile platform, a first connection request, the first connection request including first verification information of the mobile platform;
sending, by the mobile platform via a software defined radio (SDR), the first verification information of the mobile platform to a short-range control terminal;
sending, by the mobile platform, the first connection request to a server; and
establishing, by the mobile platform, a mobile link between a remote control terminal and the mobile platform via a mobile network in response to the first verification information in the first connection request being same as second verification information of the mobile platform in a second connection request, the second connection request being generated by the remote control terminal based on the first verification information of the mobile platform received from the short-range control terminal, the second connection request being sent to the server by the remote control terminal, and the mobile network including at least one of a third-generation mobile communication network, a fourth-generation mobile communication network, or a fifth-generation mobile communication network.

17. The method of claim 16, wherein:
a communication range of the short-range control terminal is shorter than a communication range of the remote control terminal.

\* \* \* \* \*